US012668162B2

(12) United States Patent
Yamaguchi et al.

(10) Patent No.: US 12,668,162 B2
(45) Date of Patent: Jun. 30, 2026

(54) SEATBACK AND VEHICLE SEAT

(71) Applicant: TOYOTA BOSHOKU KABUSHIKI KAISHA, Aichi (JP)

(72) Inventors: Takuya Yamaguchi, Miyoshi (JP); Kenji Hashimoto, Nisshin (JP); Takahiro Kawahara, Toyokawa (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 165 days.

(21) Appl. No.: 18/679,899

(22) Filed: May 31, 2024

(65) Prior Publication Data

US 2024/0409016 A1     Dec. 12, 2024

(30) Foreign Application Priority Data

Jun. 6, 2023   (JP) ................................. 2023-093270

(51) Int. Cl.
*B60N 2/66* (2006.01)
(52) U.S. Cl.
CPC ............. *B60N 2/666* (2015.04); *B60N 2/667* (2015.04)
(58) Field of Classification Search
CPC .... B60N 2/667; B60N 2/6671; B60N 2/6673; B60N 2/666; B60N 2/02253
See application file for complete search history.

(56) References Cited

U.S. PATENT DOCUMENTS

| | | | | |
|---|---|---|---|---|
| 4,155,592 A * | 5/1979 | Tsuda | ................... | B60N 2/6673 |
| | | | | 297/284.4 |
| 8,668,266 B2 * | 3/2014 | Jaranson | .............. | B60N 2/6673 |
| | | | | 297/284.4 |

FOREIGN PATENT DOCUMENTS

| | | | | |
|---|---|---|---|---|
| DE | 101 35 122 | 12/2002 | | |
| DE | 102014208188 A1 * | 11/2015 | ........... | B60N 2/6673 |
| WO | WO-2015106338 A1 * | 7/2015 | ........... | B60N 2/6671 |
| WO | WO-2022145191 A1 * | 7/2022 | ........... | B60N 2/0268 |

OTHER PUBLICATIONS

English translation utilized during examination for DE-102014208188-A1 (Year: 2015).*
English translation utilized during examination for WO-2022145191-A1 (Year: 2022).*

* cited by examiner

*Primary Examiner* — David R Dunn
*Assistant Examiner* — Troy Alan Libby
(74) *Attorney, Agent, or Firm* — Greenblum & Bernstein, P.L.C.

(57) ABSTRACT

A seatback includes a pressure-receiving member and a drive mechanism. The pressure-receiving member includes a first pressure-receiving portion configured to support a lumbar region of an occupant, and a second pressure-receiving portion joined to an upper part of the first pressure-receiving portion and configured to support a back of the occupant in cooperation with the first pressure-receiving portion. The drive mechanism is configured to displace the pressure-receiving member between a support position and a non-support position, which is a position rearward of the support position. The pressure-receiving member is configured, when in the support position, to be bent at a joining portion where the first pressure-receiving portion and the second pressure-receiving portion are joined together to become convex toward a seat front side.

4 Claims, 6 Drawing Sheets

SEATBACK AND VEHICLE SEAT

CROSS-REFERENCE TO RELATED APPLICATIONS

This application claims the benefit of Japanese Patent Application No. 2023-093270 filed on Jun. 6, 2023 with the Japan Patent Office, the entire disclosure of which is incorporated herein by reference.

BACKGROUND

The present disclosure relates to a seatback and so on having a so-called "lumbar support" function.

For example, a lumbar support device disclosed in German Patent No. 10135122 supports a lumbar region of an occupant so as to press the lumbar region by curving a pressure-receiving plate into an arc-like shape.

SUMMARY

However, since the lumbar support device disclosed in German Patent No. 10135122 has a configuration in which the pressure-receiving plate is curved into an arc-like shape, it is difficult to exert a sufficient supporting force. The present disclosure discloses an example of a seatback with such a point taken into account.

It is desirable that a seatback configured to support a back of an occupant comprise, for example, at least one of the elements below. Specifically, the elements include: a pressure-receiving member including a first pressure-receiving portion configured to support a lumbar region of the occupant, and a second pressure-receiving portion joined to an upper part of the first pressure-receiving portion and configured to support the back of the occupant in cooperation with the first pressure-receiving portion; and a drive mechanism configured to displace the pressure-receiving member between a support position that is on the occupant's side and a non-support position that is rearward of the support position, and it is desirable that the pressure-receiving member be configured, when in the support position, to be bent at a joining portion where the first pressure-receiving portion and the second pressure-receiving portion are joined together to become convex toward a seat front side.

In the seatback configured as above, when the pressure-receiving plate is in the support position, the pressure-receiving member is bent at the joining portion where the first pressure-receiving portion and the second pressure-receiving portion are joined together to become convex toward the seat front side, and thus, it is possible to exert a sufficient supporting force as compared with a seatback provided with a conventional lumbar support device curved in an arc-like shape.

The seatback may be configured as below, for example. Specifically, it is desirable that the pressure-receiving member comprise a pressure-receiving plate in which the first pressure-receiving portion, the second pressure-receiving portion, and the joining portion are integrated in one piece, and that the joining portion have a lower flexural rigidity than the first pressure-receiving portion and the second pressure-receiving portion and be elastically deformable.

It is desirable that the seatback further comprise a support member that rotatably supports the pressure-receiving plate at a first end thereof in an up-down direction, and that, when a part of the pressure-receiving plate that is rotatably supported by the support member is referred to as a rotation center, and when a second end, in the up-down direction, of the pressure-receiving plate is referred to as a rotation end, and when a distance from the rotation center to the rotation end is referred to as a pressure-receiving plate length, the rotation end when the pressure-receiving plate is in the support position be located on the occupant's side relative to the rotation end when the pressure-receiving plate is in the non-support position, and that the pressure-receiving plate length when the pressure-receiving plate is in the support position be smaller than the pressure-receiving plate length when the pressure-receiving plate is in the non-support position.

Moreover, it is desirable that the drive mechanism comprise: a rotation arm, a first end of which is rotatably coupled to the pressure-receiving plate and a second end of which is rotatably coupled to the support member, the first end being coupled at a position, in the pressure-receiving plate, closer to the rotation end than to the joining portion; and an actuator configured to cause the rotation arm to pivotally rotate about a coupling part to the support member, and that, when a distance from a coupling part where the rotation arm is coupled to the pressure-receiving plate to the rotation center is referred to as an arm end radius, and when a distance from the coupling part where the rotation arm is coupled to the support member to the rotation center is referred to as a center end radius, a difference between the arm end radius when the pressure-receiving plate is in the support position and the center end radius be smaller than a difference between the arm end radius when the pressure-receiving plate is in the non-support position and the center end radius.

Furthermore, it is desirable that the seatback further comprise a bending regulator configured, while the pressure-receiving plate is being displaced from the non-support position to the support position, to cause the pressure-receiving plate to be bent so as to become convex toward the seat front side.

This makes it possible to cause the pressure-receiving plate to be bent so as to surely become convex toward the seat front side.

BRIEF DESCRIPTION OF THE DRAWINGS

Example embodiments of the present disclosure will be described below with reference to the accompanying drawings, in which.

DETAILED DESCRIPTION OF EXEMPLARY EMBODIMENTS

Figure 1:
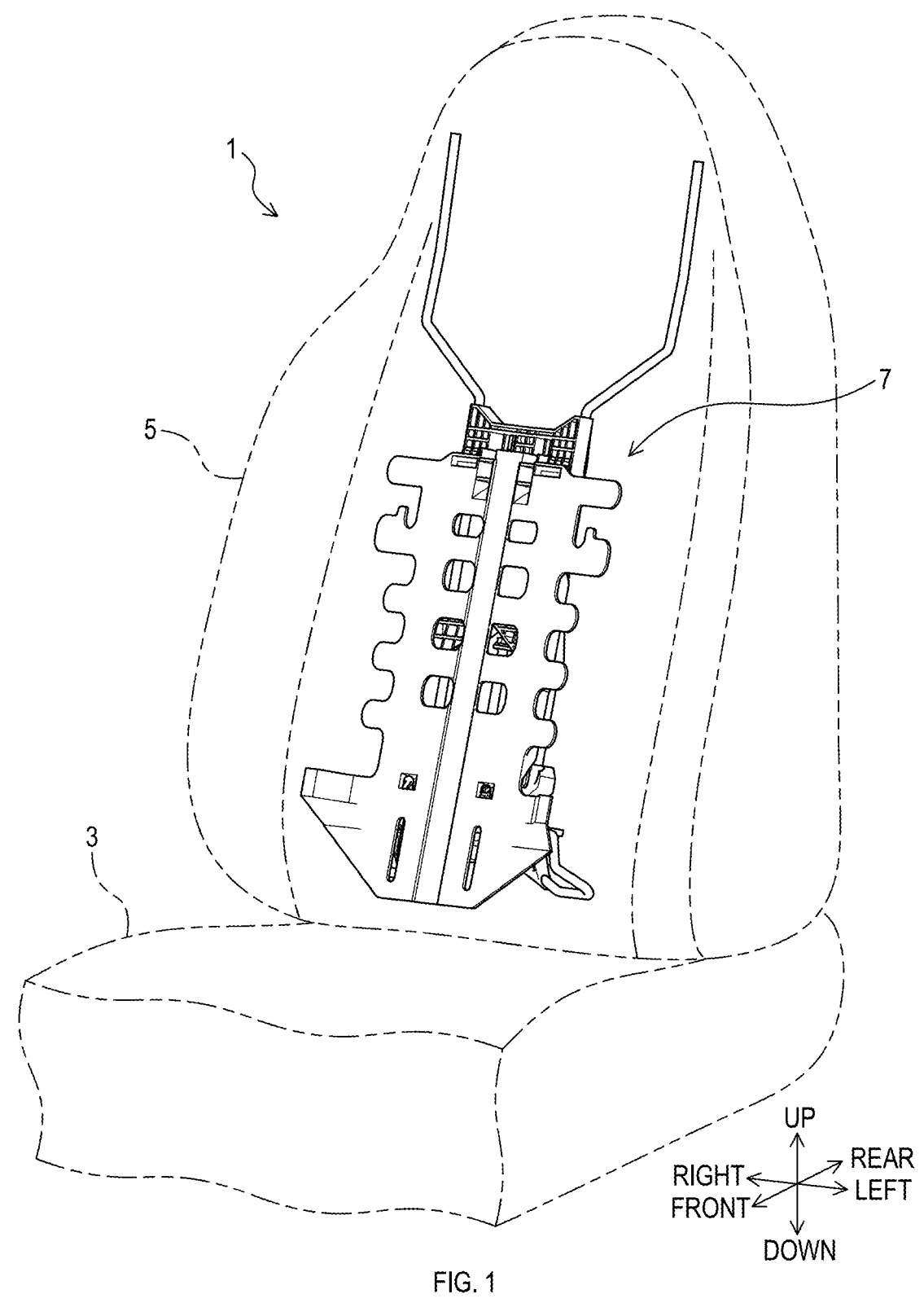
FIG. 1 is a diagram showing a vehicle seat according to a first embodiment.

Below-described embodiments show examples of the embodiments that fall within the technical scope of the present disclosure. That is, invention-specifying matters and so on recited in the appended claims are not limited by specific configurations, structures, and so on indicated in the embodiments below.

The embodiments below are examples in which a seatback according to the present disclosure is applied to a seat to be mounted in a vehicle such as an automobile (hereinafter referred to as a "vehicle seat"). Arrows indicating directions, hatched lines, and so on shown in the drawings are provided for the purpose of easier understanding of mutual relationships between the drawings, shapes of members or portions, and so on.

Thus, the seatback is not limited by the directions shown in the drawings. The directions shown in the drawings are directions in a state where the vehicle seat according to the embodiments below is mounted in the automobile. The drawings provided with hatched lines do not necessarily represent sectional views.

A member or a portion described at least with a reference numeral is at least one in number except in a case of being accompanied by a restrictive wording such as "only one". In other words, the member or the portion may be two or more in number in a case of not being accompanied by the restrictive wording such as "only one". The seatback disclosed in the present disclosure comprises at least one of (i) an element such as the member or the portion described at least with a reference numeral or (ii) a structural portion shown in the drawings.

First Embodiment

1. Overview of Vehicle Seat

As shown in FIG. 1, a vehicle seat 1 comprises a seat cushion 3, a seatback 5, and so on. The seat cushion 3 supports an occupant's buttocks. The seatback 5 supports the occupant's back.

The seatback 5 is provided with a lumbar support device 7. The lumbar support device 7 is a device for supporting the occupant's lumbar region and is switchable between a support state and a non-support state.

The support state refers to a state for supporting the occupant's lumbar region so as to press the lumbar region. The non-support state refers to a state where the support state is canceled. Thus, in the non-support state, the lumbar support device 7 does not press the occupant's lumbar region proactively.

2. Details of Lumbar Support Device

Figure 2:
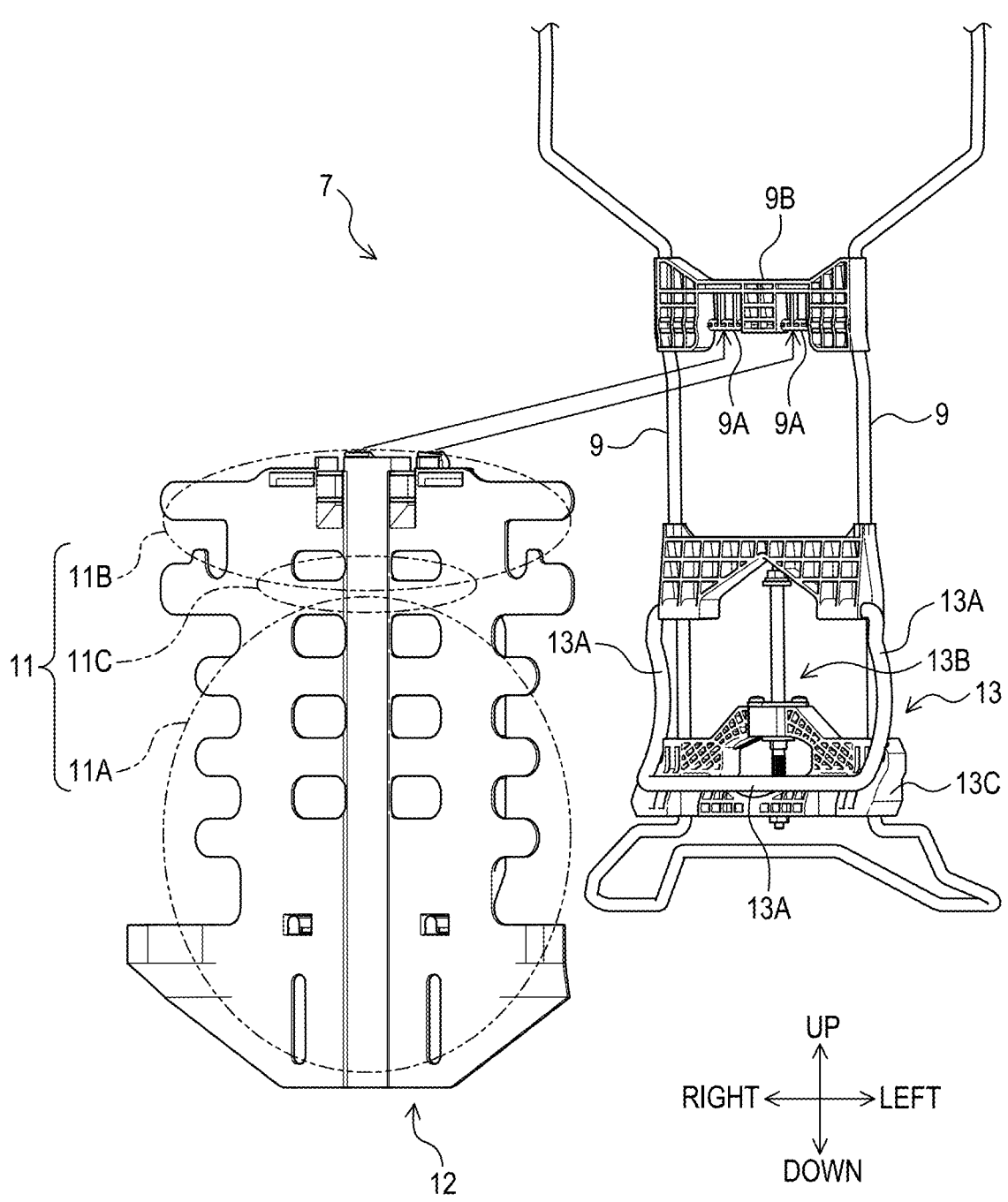
FIG. 2 is an exploded view of a lumbar support device according to the first embodiment.

As shown in FIG. 2, the lumbar support device 7 comprises a frame 9 (i.e., a support member), a pressure-receiving member 11, a drive mechanism 13, and so on. The frame 9 is a member that forms a part of a framework of the seatback 5. The frame 9 according to the present embodiment includes a part formed of a wire-shaped steel material.

2.1 Pressure-Receiving Member (Pressure-Receiving Plate)

The pressure-receiving member 11 is a member to receive a load from the occupant's back. Specifically, the pressure-receiving member 11 comprises a pressure-receiving plate 12 in which a first pressure-receiving portion 11A, a second pressure-receiving portion 11B, and a joining portion 11C are integrated in one piece.

The first pressure-receiving portion 11A is a plate-shaped portion that supports the occupant's lumbar region. The second pressure-receiving portion 11B is a plate-shaped portion that is joined to an upper part of the first pressure-receiving portion 11A and that supports the occupant's back in cooperation with the first pressure-receiving portion 11A.

The joining portion 11C joins together the first pressure-receiving portion 11A and the second pressure-receiving portion 11B. In the present embodiment, the first pressure-receiving portion 11A, the second pressure-receiving portion 11B, and the joining portion 11C are formed of a single resin plate.

Figure 3:
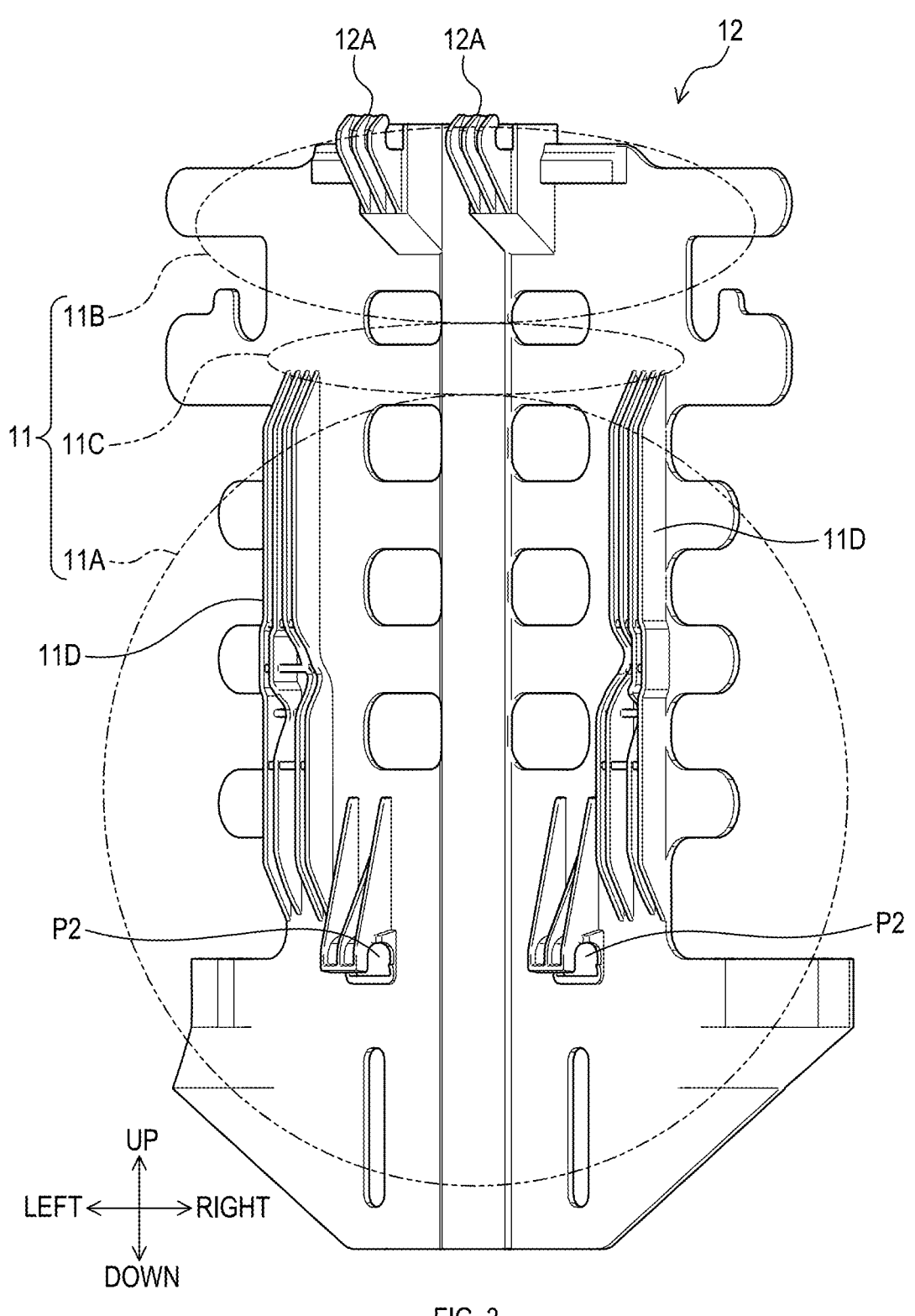
FIG. 3 is a diagram showing a pressure-receiving plate according to the first embodiment.

As shown in FIG. 3, provided on a reverse side of the first pressure-receiving portion 11A is a flange 11D protruding from the reverse side. The flange 11D is a reinforcing portion for making a flexural rigidity of the first pressure-receiving portion 11A higher than that of the second pressure-receiving portion 11B.

Specifically, the flange 11D is formed of a plurality of wall-like parts protruding from the reverse side of the first pressure-receiving portion 11A. This results in increasing the first pressure-receiving portion 11A in flexural rigidity as compared with the second pressure-receiving portion 11B and the joining portion 11C, which are not provided with the flange 11D and so on.

The flexural rigidity as used herein refers to a flexural rigidity about an axis parallel to a seat width direction (i.e., a left-right direction on a drawing sheet). Provided to the pressure-receiving member 11, in other words the pressure-receiving plate 12, on a first end side thereof in an up-down direction (i.e., on an upper end side thereof in the present embodiment), is at least one hinge 12A (two or more hinges 12A in the present embodiment) having a hook shape.

As shown in FIG. 2, the frame 9 is provided with the same number of at least one shaft portion 9A as the at least one hinge 12A. Each shaft portion 9A is a round bar or a cylindrical member with which the corresponding hinge 12A rotatably fits together, and an axial direction of each shaft portion 9A is parallel to the seat width direction. The shaft portion 9A is provided to a block 9B of resin, which is fixed to the frame 9.

In a state where each hinge 12A fits together with the corresponding shaft portion 9A, the pressure-receiving plate 12 is rotatably supported at the upper end side thereof by the frame 9 via the shaft portion 9A. In the present embodiment, each hinge 12A has a substantially U shape with its upper side opened.

Each shaft portion 9A fits into the corresponding hinge 12A through an upper opening of the hinge 12A. In this state, a lower part of the pressure-receiving plate 12 is supported by a rotation arm 13A (see FIG. 4), and thus, each hinge 12A does not fall off from the corresponding shaft portion 9A.

2.2 Drive Mechanism

Figure 4:
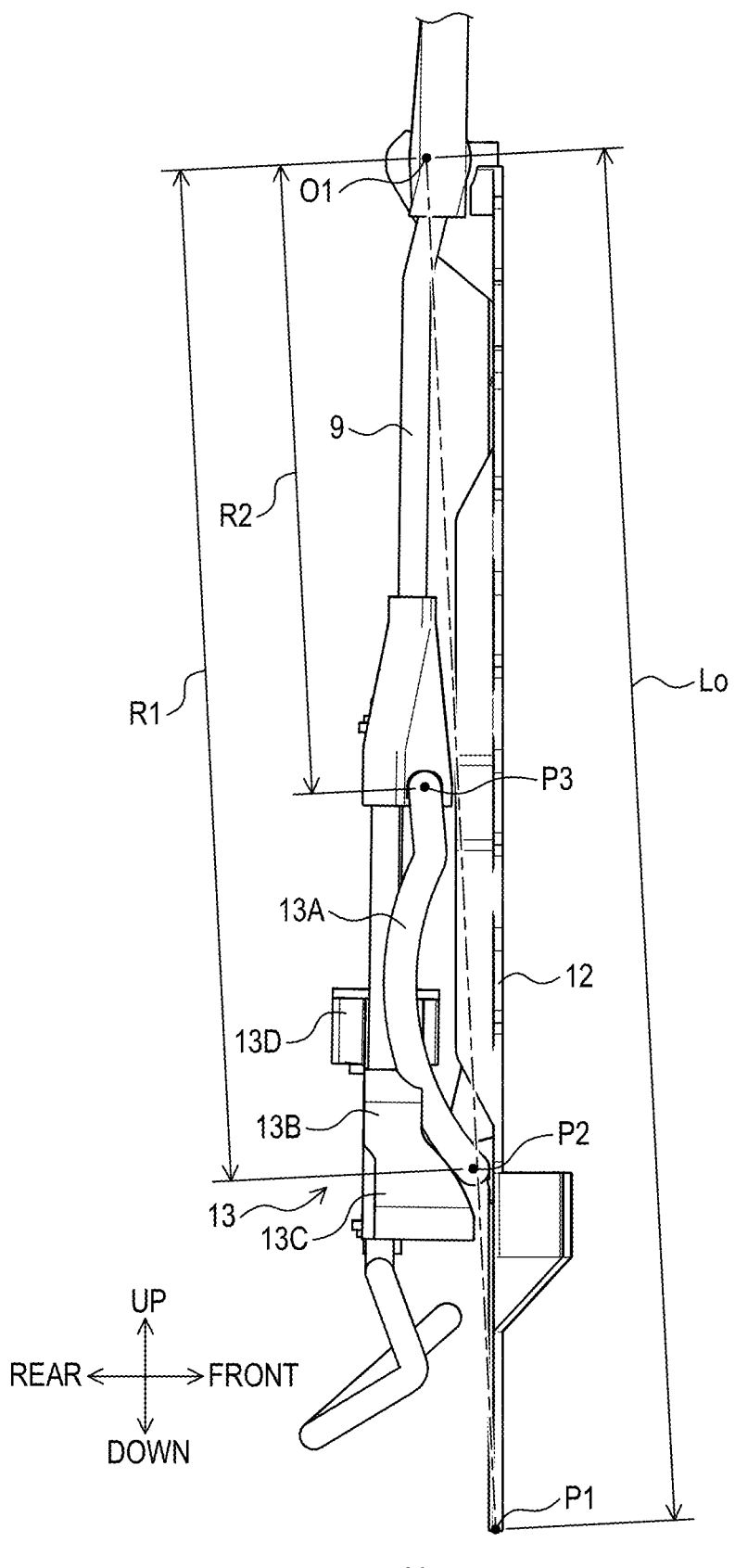
FIG. 4 is a diagram showing the pressure-receiving plate in a non-support position.

The drive mechanism 13 is a mechanism for deforming and/or displacing the pressure-receiving plate 12 between a support position (see FIG. 5) and a non-support position (see FIG. 4). The support position is a position on the occupant's side relative to the non-support position, and the pressure-receiving plate 12 in the support position is in the support state.

The non-support position is a position rearward of the support position, and the pressure-receiving plate 12 in the non-support position is in the non-support state. The pressure-receiving plate 12 in the support position is bent at the joining portion 11C to become convex toward a seat front side, thus being in a bent state (see FIG. 5).

Specifically, the first pressure-receiving portion 11A has a higher flexural rigidity than the second pressure-receiving portion 11B and the joining portion 11C owing to provision of the two or more flanges 11D. The second pressure-receiving portion 11B has a higher flexural rigidity than the joining portion 11C owing to provision of the hinge 12A as shown in FIG. 3.

Thus, the joining portion 11C, which has a lower flexural rigidity than the first pressure-receiving portion 11A and the second pressure-receiving portion 11B, is elastically deformable. Accordingly, when a force to compress the pressure-receiving plate 12 in the up-down direction is applied to the pressure-receiving plate 12, buckling deformation occurs in the pressure-receiving plate 12 at the joining portion 11C.

That is, when the pressure-receiving plate 12 is in the support position, the pressure-receiving plate 12 is in the state bent at the joining portion 11C. Thus, a pressure-receiving plate length Lo when the pressure-receiving plate 12 is in the support position (see FIG. 5) is smaller than the pressure-receiving plate length Lo when the pressure-receiving plate 12 is in the non-support position (see FIG. 4).

The pressure-receiving plate length Lo refers to a distance from a rotation center O1 to a rotation end P1 of the pressure-receiving plate 12. The rotation center O1 refers to a part, of the pressure-receiving plate 12, rotatably supported by the frame 9, that is, a central axis of the shaft portion 9A.

The rotation end P1 of the pressure-receiving plate 12 refers to an end, of the pressure-receiving plate 12, opposite the rotation center O1 in the up-down direction (i.e., a lower end of the pressure-receiving plate 12 in the present embodiment). The rotation end P1 in the support state is located on the occupant's side relative to the rotation end P1 in the non-support state, that is, located on the seat front side.

As shown in FIG. 4, the drive mechanism 13 is configured with at least the rotation arm 13A, an actuator 13B, and so on.

A first end of the rotation arm 13A is rotatably coupled to the pressure-receiving plate 12, and a second end of the rotation arm 13A is rotatably coupled to the frame 9. In the present embodiment, the first end corresponds to a lower end, and the second end corresponds to an upper end.

Figure 5:
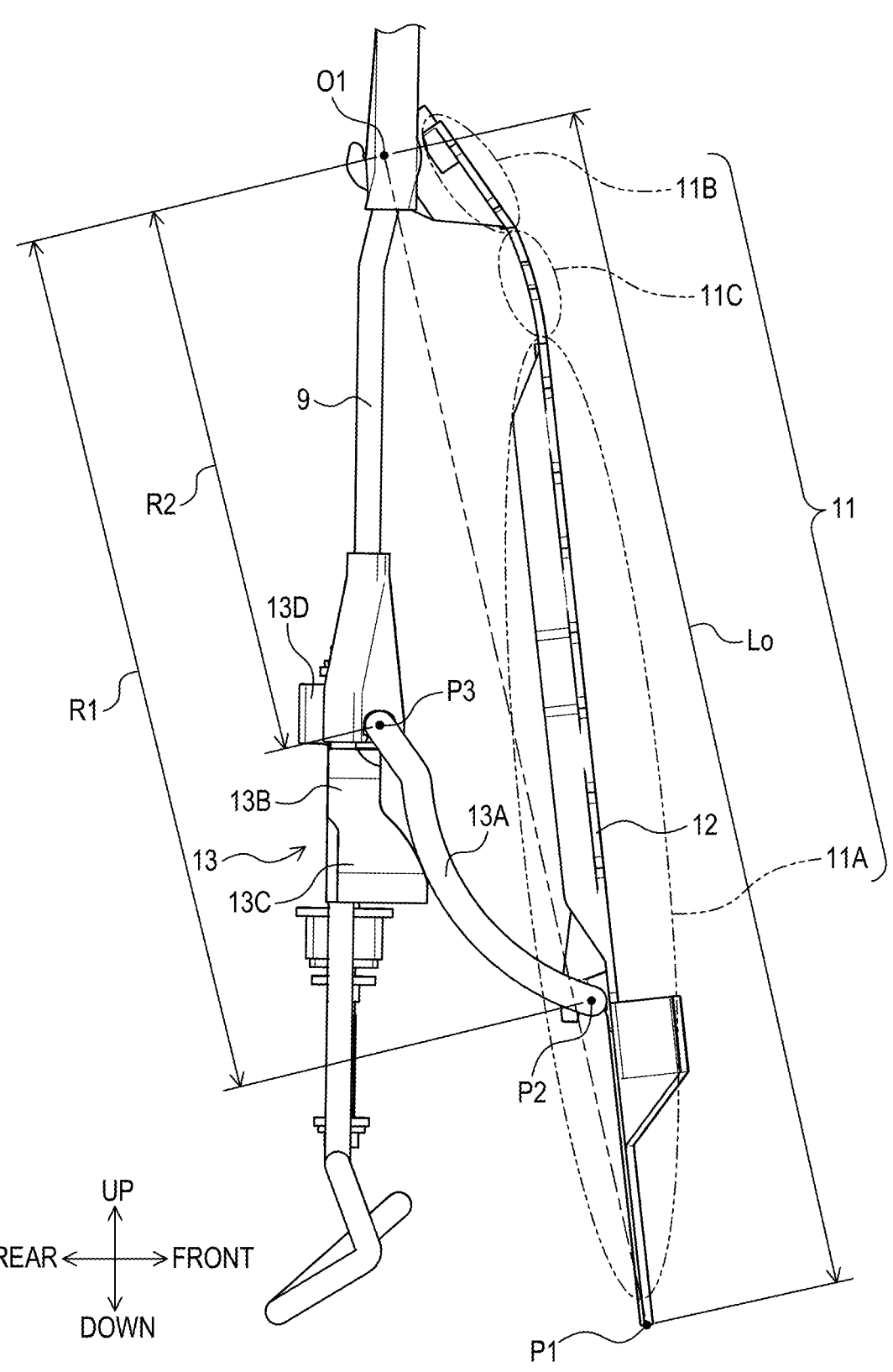
FIG. 5 is a diagram showing the pressure-receiving plate in a support position.

A coupling part P2 where the rotation arm 13A is coupled to the pressure-receiving plate 12 is at a position closer to the rotation end P1 than to the joining portion 11C (see FIG. 5). A coupling part P3 where the rotation arm 13A is coupled to the frame 9 is located between the joining portion 11C and the rotation end P1. That is, an upper end of the rotation arm 13A is in a position lower than the joining portion 11C and higher than the lower end of the pressure-receiving plate 12.

A difference between an arm end radius R1 (see FIG. 5) and a center end radius R2 (see FIG. 5) when the pressure-receiving plate 12 is in the support position is smaller than a difference between the arm end radius R1 and the center end radius R2 when the pressure-receiving plate 12 is in the non-support position.

The arm end radius R1 refers to a distance from the coupling part P2 where the rotation arm 13A is coupled to the pressure-receiving plate 12 to the rotation center O1. The center end radius R2 refers to a distance from the coupling part P3 where the rotation arm 13A is coupled to the frame 9 to the rotation center O1.

The actuator 13B is a mechanism that causes the rotation arm 13A to rotate pivotally about the coupling part P3 to the frame 9. Specifically, as shown in FIG. 4, the actuator 13B comprises a slider cam 13C, a motor 13D, and so on.

The slider cam 13C is a member that is displaced by sliding in the up-down direction while in sliding contact with the rotation arm 13A. The motor 13D causes the slider cam 13C to be displaced by sliding, by utilizing a principle of a screw.

When the slider cam 13C is displaced toward the coupling part P3, a lower end of the rotation arm 13A is displaced toward the occupant's side, that is, toward the seat front side (see FIG. 5). When the slider cam 13C is displaced downward, the lower end of the rotation arm 13A is displaced toward a seat rear side (see FIG. 4).

When the lower end of the rotation arm 13A rotates toward the seat front side, the rotation arm 13A applies the force to compress the pressure-receiving plate 12 in the up-down direction to the pressure-receiving plate 12. This pivotal rotation of the rotation arm 13A results in bending the pressure-receiving plate 12 in a buckling manner.

3. Feature of Vehicle Seat (Especially, Lumbar Support Device) According to the Present Embodiment The lumbar support device 7 according to the present embodiment is configured such that, when the pressure-receiving plate 12 is in the support position, the pressure-receiving plate 12 is bent at the joining portion 11C to become convex toward the seat front side. This makes it possible to exert a sufficient supporting force as compared with a conventional lumbar support device curved in an arc-like shape.

Second Embodiment

Figure 6:
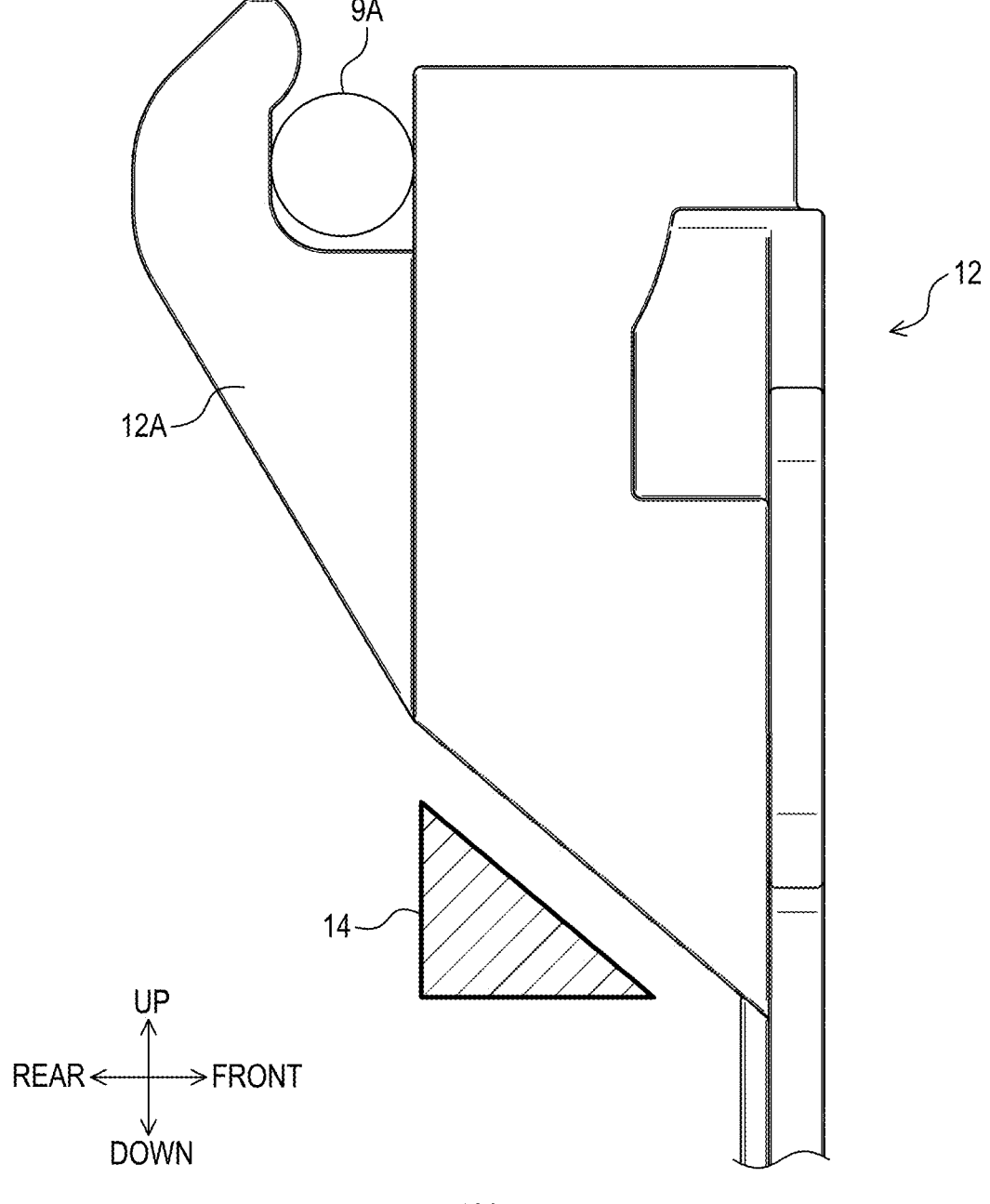
FIG. 6 is a diagram showing an essential part of a lumbar support device according to a second embodiment.

As shown in FIG. 6, the vehicle seat 1 of the present embodiment is provided with a bending regulator 14. While the pressure-receiving plate 12 is being displaced from the non-support position to the support position, the bending regulator 14 helps the pressure-receiving plate 12 to be bent so as to surely become convex toward the seat front side.

In other words, while the pressure-receiving plate 12 is being displaced from the non-support position to the support position, the bending regulator 14 regulates the pressure-receiving plate 12 not to be bent to become convex toward the seat rear side.

Specifically, if the pressure-receiving plate 12 is about to be bent so as to become convex toward the seat rear side, the pressure-receiving plate 12 is brought into contact with the bending regulator 14, and thus, the pressure-receiving plate 12 is inhibited from being bent so as to become convex toward the seat rear side.

The vehicle seat 1 of the present embodiment may be configured as below, for example.

Specifically, the vehicle seat 1 comprises a contact portion that is provided to the pressure-receiving plate 12 so as to be contactable with the shaft portion 9A and that constitutes the bending regulator. The contact portion is spaced apart from the shaft portion 9A when the pressure-receiving plate 12 is in the non-support position, and the contact portion comes into contact with the shaft portion 9A during displacement of the pressure-receiving plate 12 from the non-support position to the support position.

When an imaginary line perpendicular to the central axis of the shaft portion 9A and to the rotary central axis of the coupling part P2 where the rotation arm 13A is coupled to the pressure-receiving plate 12 is referred to as a central perpendicular line, it is desirable that a part where the contact portion is in contact with the shaft portion 9A be located on the side of the pressure-receiving plate 12 relative to the central perpendicular line.

Other Embodiments

In the above-described embodiments, the configuration is employed that comprises the pressure-receiving plate 12 in which the first pressure-receiving portion 11A, the second pressure-receiving portion 11B, and the joining portion 11C are integrated in one piece. However, the present disclosure is not limited thereto. Specifically, a configuration may be employed in which, for example, the first pressure-receiving portion 11A and the second pressure-receiving portion 11B are separate members and the joining portion 11C formed as a hinge joins together the first pressure-receiving portion 11A and the second pressure-receiving portion 11B.

The two or more flanges 11D are provided on the reverse side of the first pressure-receiving portion 11A of the above-described embodiments. However, the present disclosure is not limited thereto. Specifically, in the present disclosure, a thickness dimension of the first pressure-receiving portion 11A may be made larger than that of the second pressure-receiving portion 11B, for example.

The actuator 13B according to the above-described embodiments is configured such that the slider cam 13C is displaced by sliding to thereby cause the rotation arm 13A to pivotally rotate, by utilizing a principle of a screw. However, the present disclosure is not limited thereto. Specifically, in the present disclosure, a link mechanism may be used to cause the rotation arm 13A to pivotally rotate, for example.

In the above-described embodiments, the upper end of the pressure-receiving plate 12 is rotatably coupled to the frame 9. However, the present disclosure is not limited thereto. Specifically, in the present disclosure, the lower end of the pressure-receiving plate 12 may be rotatably coupled to the frame 9, for example.

The drive mechanism 13 according to the above-described embodiments comprises the rotation arm 13A, the actuator 13B, and so on. However, the present disclosure is not limited thereto. Specifically, in the present disclosure, the pressure-receiving plate 12 may be bent by a drive mechanism using a rotating cam, for example.

In the above-described embodiments, the vehicle seat according to the present disclosure is mounted in the automobile, for example. However, the present disclosure is also applicable to, for example, a seat used in vehicles such as railroad vehicles, ships, or aircraft, and to a stationary seat used in theaters, at home, or in other places.

Moreover, the present disclosure only needs to be consistent with the gist of the disclosure described in the above-described embodiments, and is not limited to the above-described embodiments. Therefore, configuration may be employed in which at least two embodiments among the above-described embodiments are combined together or in which any of the elements shown in the drawings or the elements described with reference numerals is omitted in the above-described embodiments.

What is claimed is:

1. A seatback configured to support a back of an occupant, the seatback comprising:

a pressure-receiving member including:

a first pressure-receiving portion configured to support a lumbar region of the occupant, and a second pressure-receiving portion joined to an upper part of the first pressure-receiving portion and configured to support the back of the occupant in cooperation with the first pressure-receiving portion; and a drive mechanism configured to displace the pressure-receiving member between a support position that is on the occupant's side and a non-support position that is rearward of the support position, and a support member that rotatably supports a pressure-receiving plate at a first end thereof in an up-down direction, wherein the pressure-receiving member is configured, when in the support position, to be bent at a joining portion where the first pressure-receiving portion and the second pressure-receiving portion are joined together to become convex toward a seat front side, wherein the pressure-receiving member comprises the pressure-receiving plate in which the first pressure-receiving portion, the second pressure-receiving portion, and the joining portion are integrated in one piece, wherein the joining portion has a lower flexural rigidity than the first pressure-receiving portion and the second pressure-receiving portion and is elastically deformable, wherein, when a part of the pressure-receiving plate that is rotatably supported by the support member is referred to as a rotation center, and when a second end, in the up-down direction, of the pressure-receiving plate is referred to as a rotation end, and when a distance from the rotation center to the rotation end is referred to as a pressure-receiving plate length, the rotation end when the pressure-receiving plate is in the support position is located on the occupant's side relative to the rotation end when the pressure-receiving plate is in the non-support position, and wherein the pressure-receiving plate length when the pressure-receiving plate is in the support position is smaller than the pressure-receiving plate length when the pressure-receiving plate is in the non-support position.

2. The seatback according to claim 1, wherein the drive mechanism comprises:

a rotation arm, a first end of which is rotatably coupled to the pressure-receiving plate and a second end of which is rotatably coupled to the support member, the first end being coupled at a position, in the pressure-receiving plate, closer to the rotation end than to the joining portion; and an actuator configured to cause the rotation arm to pivotally rotate about a coupling part to the support member, wherein, when a distance from a coupling part where the rotation arm is coupled to the pressure-receiving plate to the rotation center is referred to as an arm end radius, and when a distance from the coupling part where the rotation arm is coupled to the support member to the rotation center is referred to as a center end radius, a difference between the arm end radius when the pressure-receiving plate is in the support position and the center end radius is smaller than a difference between the arm end radius when the pressure-receiving plate is in the non-support position and the center end radius.

3. The seatback according to claim 2, further comprising: a bending regulator configured, while the pressure-receiving plate is being displaced from the non-support position to the support position, to cause the pressure-receiving plate to be bent so as to become convex toward the seat front side.

4. A vehicle seat comprising a seatback according to claim 1.

* * * * *